(12) United States Patent
Arai et al.

(10) Patent No.: US 7,217,467 B2
(45) Date of Patent: May 15, 2007

(54) PERPENDICULAR MAGNETIC RECORDING MEDIUM AND MAGNETIC RECORDING/REPRODUCING APPARATUS

(75) Inventors: Reiko Arai, Odawara (JP); Kiwamu Tanahashi, Kokubunji (JP); Atsushi Kikugawa, Higashimurayama (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 229 days.

(21) Appl. No.: 10/699,737

(22) Filed: Nov. 4, 2003

(65) Prior Publication Data
US 2004/0233565 A1 Nov. 25, 2004

(30) Foreign Application Priority Data
May 22, 2003 (JP) .............................. 2003-144260

(51) Int. Cl.
*G11B 5/667* (2006.01)
*G11B 5/673* (2006.01)
(52) U.S. Cl. ..................................... 428/828.1; 428/829
(58) Field of Classification Search .................... None
See application file for complete search history.

(56) References Cited

U.S. PATENT DOCUMENTS 5,942,342 A * 8/1999 Hikosaka et al. ........ 428/832.1
6,395,388 B1 * 5/2002 Iwasaki et al. .............. 428/332
2002/0048693 A1 * 4/2002 Tanahashi et al. ...... 428/694 TS

* cited by examiner

*Primary Examiner*—Kevin M. Bernatz
(74) *Attorney, Agent, or Firm*—Antonelli, Terry, Stout & Kraus, LLP.

(57) ABSTRACT

A magnetic recording/reproducing apparatus is disclosed with high storage capability. The apparatus also prevents fluctuation of readback output and decay of magnetization or erasure of recorded magnetization in the recording layer. A soft magnetic underlayer and a perpendicular recording layer are formed in specific order on the substrate of a magnetic disk. The soft magnetic underlayer has a triple-layered structure in which a domain control layer, including an anti-ferromagnetic layer, is sandwiched between two first and second soft magnetic layers. The thickness of the first and second soft magnetic layers (d1, d2) is between 25 nm and 150 nm and a ratio of d1/d2 is within a range of 0.3 to 1.5. Accordingly, magnetic domains in the soft magnetic underlayer of a perpendicular magnetic recording medium can be controlled and magnetic domain wall motion can be inhibited.

16 Claims, 16 Drawing Sheets

EXCHANGE BIAS FIELD (Hex)

COERCIVITY (Hc)

EXCHANGE BIAS FIELD (Hex)

COERCIVITY (Hc)

FIG.6
MEDIUM A
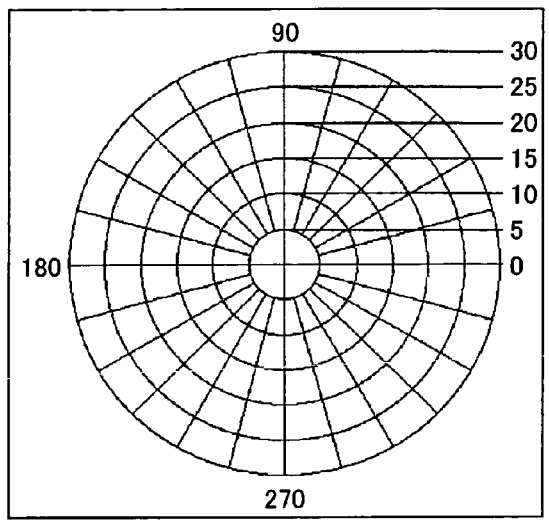
MEDIUM B
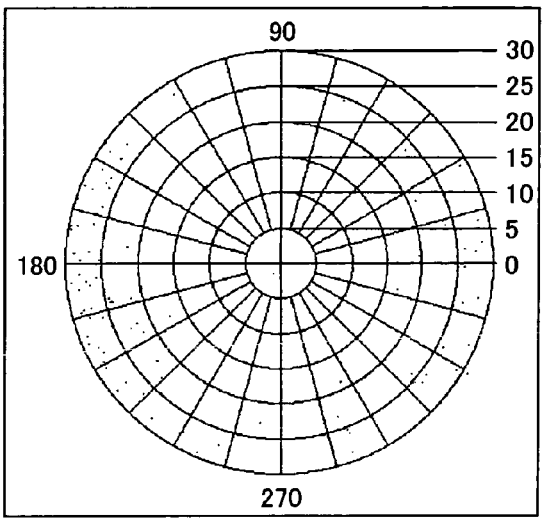
MEDIUM C
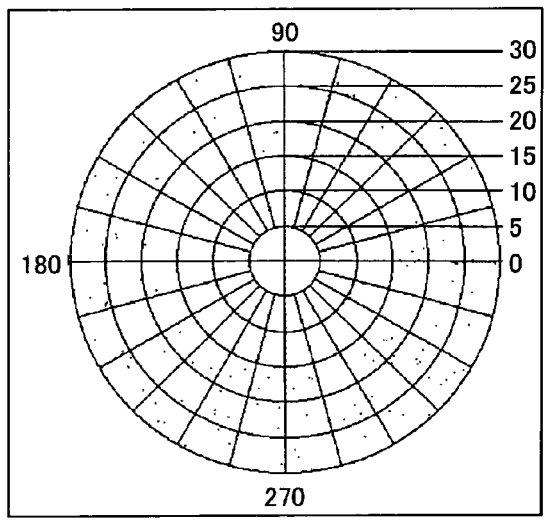
MEDIUM D (REFERENCE)
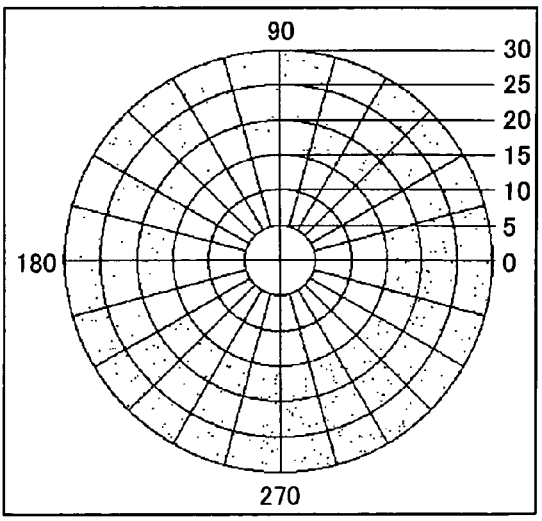

PERPENDICULAR MAGNETIC RECORDING MEDIUM AND MAGNETIC RECORDING/REPRODUCING APPARATUS

BACKGROUND OF THE INVENTION

In recent years, an areal recording density of magnetic disk storage devices (disk drives) has soared at an annual growth rate of about 100%. Meantime, a so-called thermal fluctuation problem is emerging; that is, as the areal recording density becomes higher and higher, magnetically recorded data is erased by surrounding heat. Storage researchers think it is difficult to achieve the areal recording density over 7.75 Gbits per square centimeter on a magnetic drive by conventional longitudinal recording.

Meanwhile, a perpendicular recording method, unlike the longitudinal recording method, has a feature that, as linear recording density increases, a demagnetizing field acting between adjacent bits decreases, and recording magnetization keeps stable. Moreover, a soft magnetic underlayer having a high magnetic permeability formed under a perpendicular recording layer enables magnetic heads to generate a high magnetic field and, consequently, the coercivity of the perpendicular recording layer can be increased. For these reasons, the perpendicular recording method is thought to be one of effective means to overcome the thermal fluctuation limit of the longitudinal recording method.

In the perpendicular recording method, combination of a double-layered perpendicular recording medium that consists of the soft magnetic underlayer and the perpendicular recording layer and a single-pole type head is effective for realizing high-density recording. However, because the double-layered perpendicular recording medium has the soft magnetic layer with a high saturation flux density (Bs), stray magnetic flux generated from magnetic domain walls in the soft magnetic underlayer is observed as spike noise. Moreover, a neighboring track erasure problem that information recorded on neighboring tracks are partially disordered by writing magnetic field and a stray field robustness problem that the stray field in the apparatus concentrates to recording head and the recorded magnetization decays just under the recording head are pointed out.

As means for solving these problems, inserting a hard magnetic pinning layer between the soft magnetic underlayer and the substrate to cause the soft magnetic underlayer to be magnetized in only one direction has been proposed, as disclosed in, for example, Japanese Unexamined Patent Application Publication No. Hei 7-129946 (Document Cited 1) and Japanese Unexamined Patent Application Publication No. Hei 11-191217 (Document Cited 2). Furthermore, a method for suppressing magnetic domain wall motion in the soft magnetic underlayer by an exchange coupling field to an anti-ferromagnetism by, aligning in a single direction, has been proposed, as disclosed in Japanese Unexamined Patent Application Publication No. Hei 6-103553 (Document Cited 3).

[Document Cited 1]

Japanese Unexamined Patent Application Publication No. Hei 7-129946

[Document Cited 2]

Japanese Unexamined Patent Application Publication No. Hei 11-191217

[Document Cited 3]

Japanese Unexamined Patent Application Publication No. Hei 6-103553

SUMMARY OF THE INVENTION

However, the method for producing unidirectional magnetization of the soft magnetic layer, using the hard magnetic pinning layer, makes it easy to form magnetic domains in a reverse direction around the inner and outer edges of the disk substrate, from where spike noise is observed. The method for restraining the displacement of magnetic domain walls in the soft magnetic underlayer, using the anti-ferromagnetic layer is effective for inhibiting spike noise caused by the magnetic domain walls, but cannot prevent neighboring track erasure due to anisotropy generated within the substrate.

An object of the present invention, which has been devised to solve the above-described problems, is to provide a perpendicular magnetic recording medium with an areal recording density over 7.75 Gbits per square centimeter and a high medium signal to noise ratio (S/N), in which fluctuation of readback output and decay of magnetization or erasure of recorded magnetization in the recording layer are prevented. Another object of the invention is to make it easy to realize a high-density magnetic recording/reproducing apparatus.

To achieve the foregoing objects, the perpendicular magnetic recording medium comprises a soft magnetic underlayer and a perpendicular recording layer which are deposited in this order over a substrate. The soft magnetic underlayer comprises a first soft magnetic layer, a domain control layer which includes at least an anti-ferromagnetic layer, and a second soft magnetic layer. A ratio of the first soft magnetic layer thickness d1 to the second soft magnetic layer thickness d2, d1/d2 falls within a range of 0.3 to 1.5.

A primary feature of the above perpendicular magnetic recording medium is that, in a magnetization curve of the soft magnetic underlayer, measured applying a magnetic field in a radial direction of the substrate, is shifted from the zero field axis along direction of the magnetic field and coercivity Hc of the soft magnetic underlayer, which is obtained from the magnetization curve, is smaller than exchange bias field (which corresponds to the shift from zero field axis) Hex.

Another feature of the perpendicular magnetic recording medium is that the domain control-layer further includes one or two ferromagnetic layers. The two ferromagnetic layers are formed between the anti-ferromagnetic layer and the first soft magnetic layer and between the anti-ferromagnetic layer and the second soft magnetic layer or the one ferromagnetic layer is formed between the anti-ferromagnetic layer and the first soft magnetic layer or the second soft magnetic layer.

In the perpendicular magnetic recording medium and the magnetic recording/reproducing apparatus of the present invention configured as described above, magnetic domains in the soft magnetic underlayer are controlled and magnetic domain wall motion is inhibited, and fluctuation of readback output and decay of magnetization or erasure of recorded magnetization in the recording layer are prevented.

BRIEF DESCRIPTION OF THE DRAWINGS

FIG. 6 shows spike noise distribution maps of sample disks.

DESCRIPTION OF THE PREFERRED EMBODIMENTS

Figure 1:
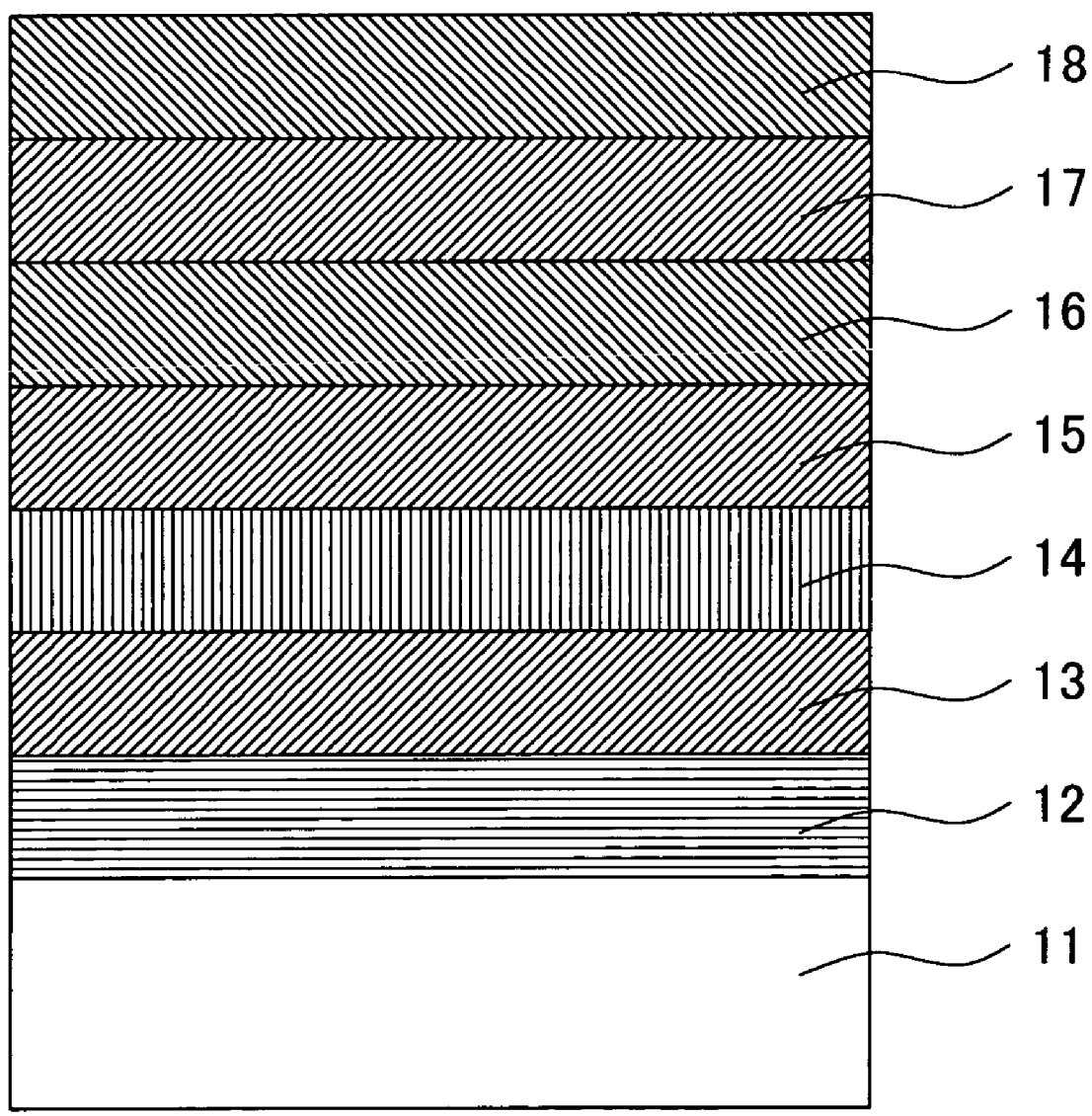
FIG. 1 is a diagram showing a layer structure of a perpendicular magnetic recording medium according to one preferred embodiment of the present invention.

A magnetic recording medium to which the present invention has applied will be described in detail hereinafter.

Preventing readback output fluctuation and decay of magnetization or erasure of recorded magnetization in the recording layer of a magnetic disk can be achieved by making the magnetic disk in the following manner. Over the substrate of the magnetic disk, a soft magnetic underlayer and a perpendicular recording layer are deposited in this order, where the soft magnetic underlayer has a triple-layered structure in which a domain control layer comprising at least an anti-ferromagnetic layer is sandwiched between two first and second soft magnetic layers. Given that the first soft magnetic layer thickness is d1 and the second soft magnetic layer thickness is d2, a ratio d1/d2 should fall within a range of 0.3 to 1.5.

Furthermore, the inventor found that the following are more effective for preventing the above. In a magnetization hysteresis curve of the soft magnetic underlayer, measured applying a magnetic field in a radial direction of the disk substrate, the magnetization hysteresis should not intersect the zero field. In other words, the magnetization curve should occur at a shift from the zero field axis along the direction of the magnetic field and the exchange bias field (Hex) which corresponds to the shift from the zero field axis should be greater than coercivity Hc which is obtained from the magnetization curve. As regards the exchange bias field, given that the exchange bias field applied to the first soft magnetic layer is Hex1 and the exchange bias field applied to the second soft magnetic layer is Hex2, Hex1 and Hex2 should assume different values.

At formation of the anti-ferromagnetic layer, an interlayer exchange coupling is necessary to act between the anti-ferromagnetic layer and the two first and second soft magnetic layers. Specifically, a disordered alloy comprising Mn and Ir or a principal constituent of Rh, RhRu, or Fe can be employed as the above material. On the other hand, ordered anti-ferromagnetic alloys such as a MnPt alloy and a NiMn alloy are generally put in a disordered state at film formation and the exchange coupling does not act between the anti-ferromagnetic layer using such materials and the soft magnetic layers.

Accordingly, after the film formation, an ordering heat treatment is required for several hours while applying a magnetic field. Such an annealing process is not preferable because it makes the medium fabrication process complex and increases the cost. The anti-ferromagnetic layer should have a thickness between 5 nm and 40 nm. This is because the anti-ferromagnetic layer thinner than 5 nm weakens exchange coupling acting between the anti-ferromagnetic layer and the soft magnetic layers and the layer thicker than 40 nm weakens magnetostatic interaction acting between the two first and second soft magnetic layers.

To make strong exchange coupling acting between the anti-ferromagnetic layer and the soft magnetic layer, it is desirable to form a ferromagnetic layer on at least one end of the anti-ferromagnetic layer. For the ferromagnetic layer, specifically, a crystalline alloy comprising a principal constituent of Co or Fe or an amorphous material in which Ta, Hf, Nb, Zr, Si, B, C, or the like is added to the above alloy can be employed. However, this ferromagnetic layer is not necessarily required when the soft magnetic layers of great magnetic moment are used.

There is no limitation for material of the first and second soft magnetic layers and requirements of the material are that Bs is at least 1 Tesla (T) or more and coercivity measured in the head travel direction is as low as several Oersteds (Oe) or below. Specifically, a material which is selected from binary or ternary alloys including any of elements Co, Fe, Ni, Ta, Zr, Nb, Cu, Ti, Cr, and B and which may be either amorphous or crystalline alloy can be employed.

To make the values of Hex1 and Hex2 differ from each other, different materials can be used for the first and second soft magnetic layers. These soft magnetic layers should have a thickness between 20 nm and 150 nm. At 20 nm and thicker, coercivity can be controlled to be low. At 150 nm and thinner, spike noise is inhibited and stray field robustness can be enhanced.

If the first soft magnetic layer is formed of an amorphous alloy, it is necessary to form a soft magnetic seed layer between the first soft magnetic layer and the anti-ferromagnetic layer to control the orientation of magnetization in the anti-ferromagnetic layer. For the soft magnetic seed layer, specifically, a crystalline alloy comprising a principal constituent of Ni or Fe or a material in which Ta, Hf, Nb, Zr, Si, B, C, or the like is added to the above alloy can be employed.

Table 1 tabulates possible combinations of materials of the soft magnetic layers and possible structures of the domain control layer. If a crystalline alloy is employed for the first soft magnetic layer, one of types ① to ④ of domain control layer structure can be applied, independent of the material of the second soft magnetic layer. If an amorphous alloy is employed for the first soft magnetic layer, one of types ⑤ to ⑧ of domain control layer structure can be applied.

This is because the exchange bias field applied between the first soft magnetic layer and the anti-ferromagnetic layer and that applied between the second soft magnetic layer and the anti-ferromagnetic layer differ in strength.

TABLE 1

| 2nd soft magnetic layer | Crystalline | Amorphous | Amorphous | Crystalline |
|---|---|---|---|---|
| Domain control layer | One of types ① to ④ below | One of types ① to ④ below | One of types ⑤ to ⑧ below | One of types ⑤ to ⑧ below |
| 1st soft magnetic layer | Crystalline | Crystalline | Amorphous | Amorphous |
|  | ① | ② | ③ | ④ |
| Types of domain control layer structure (layered on the substrate) | Anti-ferromagnetic layer | Anti-ferromagnetic layer Ferromagnetic layer | Ferromagnetic layer Anti-ferromagnetic layer | Ferromagnetic layer Anti-ferromagnetic layer Ferromagnetic layer |
|  | ⑤ | ⑥ | ⑦ | ⑧ |
|  | Anti-ferromagnetic layer Soft magnetic seed layer | Anti-ferromagnetic layer Ferromagnetic layer Soft magnetic seed layer | Ferromagnetic layer Anti-ferromagnetic layer Soft magnetic seed layer | Ferromagnetic layer Anti-ferromagnetic layer Ferromagnetic layer Soft magnetic seed layer |

Annealing in the magnetic field for the purpose of controlling the magnetic domain in the soft magnetic underlayer is performed as follows: after forming the soft magnetic underlayer, heat it to near a blocking temperature of the anti-ferromagnetic layer and cool it down to about 100° C. in the magnetic field being applied to the disk substrate in the radial direction. The magnetic field must be strong enough to substantially saturate, at least, the magnetization in the soft magnetic underlayer; specifically, the magnetic field of about 50 Oe or more should be applied to the disk substrate. Although it is ideal to cool down to room temperature, cooling to about 100° C. is practically applicable, taking account of shortening the medium fabrication process time.

The soft magnetic underlayer, after annealed in the magnetic field, is proved with uniaxial magnetic anisotropy having the easy axis of magnetization along the radial direction and unidirectional magnetic anisotropy having the easy axis of magnetization along the direction of the magnetic field. For example, if the direction of the magnetic field, in the midst of which the underlayer has been cooled, goes from the outermost to the innermost along the radius of the disk, magnetization toward the center of the disk basically takes place in the soft magnetic underlayer, except at the inner and outer edges of the disk.

In this state, magnetic domain wall can be removed except the inner and outer edges of disk substrate and, because this state is a quasi-single-domain state, spike noise can be suppressed in a data area. To realize such a domain-controlled state, it is required that magnetization assumes only one value at the zero field, that is, the magnetization hysteresis does not intersect the zero field axis In other words, it is required to increase the exchange bias field (Hex) which corresponds to the shift from the zero field axis and reduce the coercivity Hc.

Figure 16:
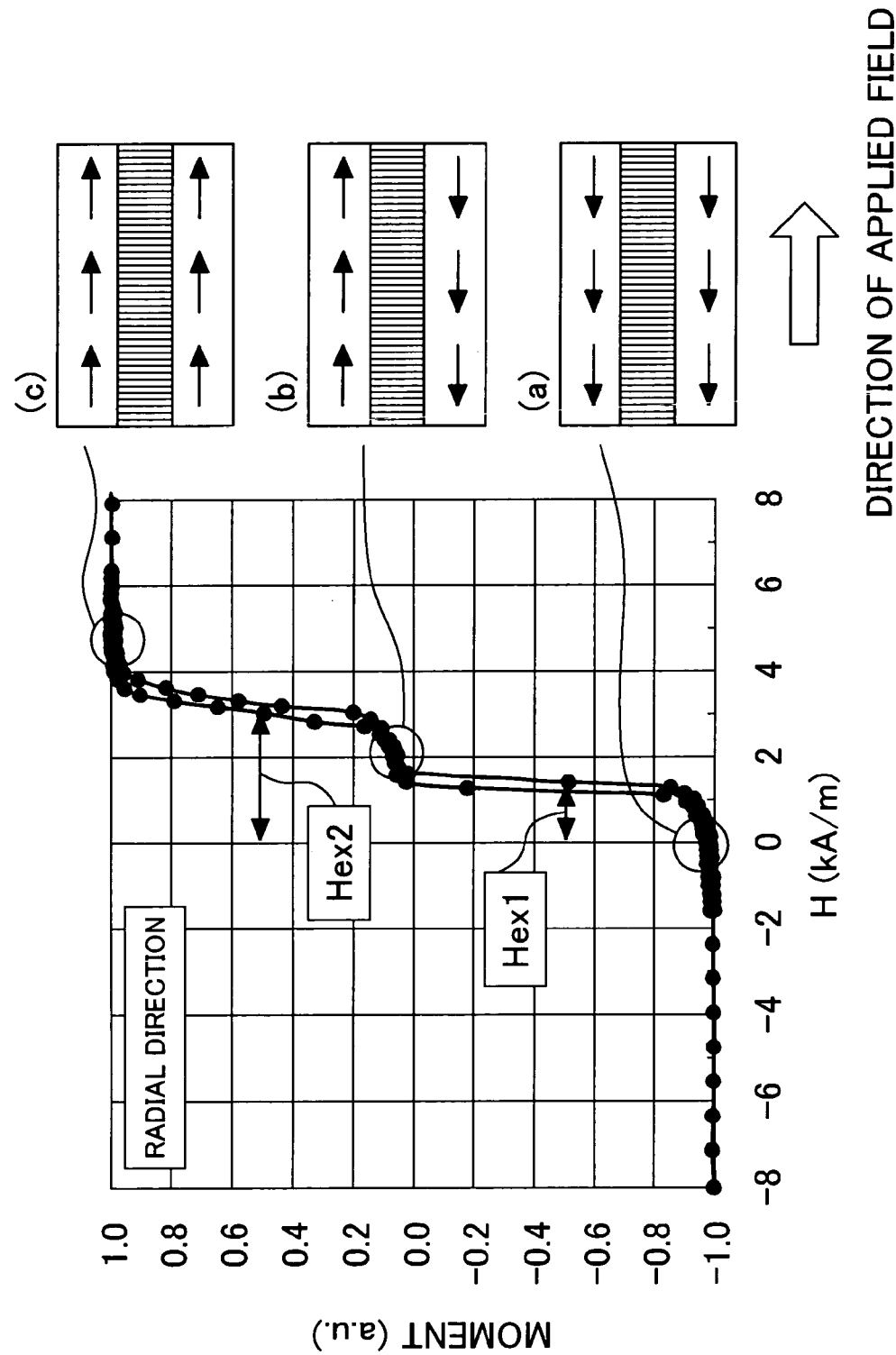
FIG. 16 shows a radial magnetization curve of the soft magnetic underlayer of the present invention.

The magnetization curve of the soft magnetic underlayer of the present invention in the radial direction of the disk substrate is basically a two-step loop, as shown in FIG. 16.

In the present invention, the directions of magnetization of the two soft magnetic layers are parallel at the zero state of the magnetic field, as shown in an explanatory view (a) in FIG. 16, under the effect of the exchange bias action in the anti-ferromagnetic layer. When the magnetic field is applied in a direction reverse to these directions of magnetization, the magnetization of one soft magnetic layer acting weaker exchange coupling begins to reverse at a positive value of the magnetic field, when the magnetization states of the two layers become antiparallel, as shown in an explanatory view (b) in FIG. 16. In this state, it is conceived that exchange bias force between the anti-ferromagnetic layer and soft magnetic layer and magnetostatic force between the two soft magnetic layers are exerted. When the application of the magnetic field further continues, the magnetization of the other soft,magnetic layer acting strong exchange coupling begins to reverse, when the magnetization directions of the two layers become parallel, but reverse to the initial magnetization directions, as shown in an explanatory view (c) in FIG. 16. In the present invention, it is conceived that the exchange bias field strength is greater than that of a conventional single layer structure by the magnetostatic action (b) between the two soft magnetic layers.

By forming an intermediate layer on the soft magnetic underlayer and forming the perpendicular recording layer on the intermediate layer, the medium noise is suppressed. For the intermediate layer, a nonmagnetic amorphous alloy, a nonmagnetic alloy having a hexagonal close-packed (hcp) structure or face centered cubic (fcc) structure, or an oxide layer can be employed. The intermediate layer may be a single-layer film or a multilayer film such as, for example, a double-layered film consisting of amorphous alloy and hcp alloy layers or a triple-layered film consisting of oxide and fcc alloy layers can be employed. For the perpendicular recording layer, an hcp-Co alloy such as a CoCrPt alloy or CoCrPtB alloy, granular such as a CoCrPt—$SiO_2$ alloy, a Co/Pd multilayer, a Co/Pt multilayer, etc. can be employed.

By forming carbon-based overcoat layer with thickness ranging from 3 nm to 10 nm on the perpendicular recording layer and further forming a lubricant layer such as perfluoro alkyl polyether, a high-reliability perpendicular recording medium can be obtained.

A magnetic recording/reproducing apparatus of the present invention comprises the foregoing perpendicular magnetic recording medium, an actuator for rotating the perpendicular magnetic recording medium in a recording direction, a magnetic head equipped with a read element and a write element, means for relatively moving the magnetic head with respect to the magnetic recording medium, and a read/write channel for inputting signals to the magnetic head and for reproducing output signals from the magnetic head, wherein the read element of the magnetic head is composed of a high sensitivity element utilizing a magnetoresistive effect or a tunneling magnetoresistive effect. Through this arrangement, a high-reliability magnetic recording/reproducing apparatus with recording density over 7.75 Gbits per square centimeter can be realized.

The perpendicular magnetic recording medium to which the present invention has applied will now be more fully described hereinafter through preferred specific embodiments of the invention.

Embodiment 1

Figure 2:
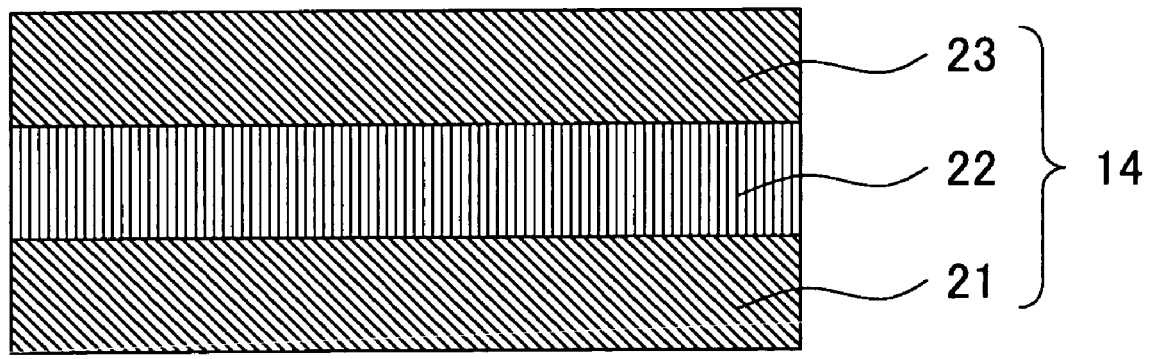
FIG. 2 is a diagram showing a layer structure of a domain control layer.

FIG. 1 shows a layer structure of a perpendicular recording medium 10 according to a preferred Embodiment 1 of the invention. For a substrate 11, a glass substrate with a diameter of 2.5 cm, after cleaned by alkali washing, was employed. On the substrate, a precoat layer 12 for ensuring a tight contact with the substrate 11, a first soft magnetic layer 13, a domain control layer 14, a second soft magnetic layer 15, an intermediate layer 16, a recording layer 17, and an overcoat layer 18 were formed in sequence by DC magnetron sputtering. The domain control layer 14 has a triple-layered structure consisting of a first ferromagnetic layer 21, anti-ferromagnetic layer 22, and second ferromagnetic layer 23, as is shown in FIG. 2. Table 2 lists target compositions employed per layer, Ar gas pressure during deposition, and layer thickness.

TABLE 2

|  | Target composition | Ar gas pressure (Pa) | Thickness (nm) |
| --- | --- | --- | --- |
| Precoat layer 12 | $Ni_{52.5}Ta_{37.5}Zr_{10}$ | 1 | 30 |
| 1st soft magnetic layer 13 | $Ni_{81}Fe_{19}$ | 0.5 | 25–200 |
| 1st ferromagnetic layer 21 | $Co_{70}Fe_{30}$ | 0.5 | 5 |
| Anti-ferromagnetic layer 22 | $Mn_{80}Ir_{20}$ | 1 | 5–50 |
| 2nd ferromagnetic layer 23 | $Co_{70}Fe_{30}$ | 0.5 | 5 |
| 2nd soft magnetic layer 15 | $Ni_{81}Fe_{19}$ | 0.5 | 25–200 |
| Intermediate layer 16 | $Ni_{52.5}Ta_{37.5}Zr_{10}$ | 1 | 5 |
| Recording layer 17 | $CoCr_{17}Pt_{14}B_4$ | 1 | 20 |
| Overcoat layer 18 | Carbon | 1 | 5 |

On the substrate 11, the precoat layer 12 of NiTaZr, first soft magnetic layer 13 of NiFe, first ferromagnetic layer 21 of CoFe, anti-ferromagnetic layer 22 of MnIr, second ferromagnetic layer 23 of CoFe, and second soft magnetic layer 15 of NiFe were formed in order. After thus forming the soft magnetic underlayer, the substrate was heated by a lamp heater until the substrate temperature reached about 200° C. Next, the intermediate layer 16 of NiTaZr and recording layer 17 of CoCrPtB were formed and the substrate was reheated by the lamp heater to about 300° C. and then cooled in the magnetic field.

The magnetic field strength during the cooling is 8 kA/m in the center of the substrate. After cooling the substrate down to about 100° C. or below, the overcoat layer 18 of carbon was formed and a lubricant of perfluoro alkyl polyether diluted with fluorocarbon was applied and the medium was finished by vanishing the surface. Through the above process, the perpendicular recording medium 10 of Embodiment 1 was produced.

Figure 13:
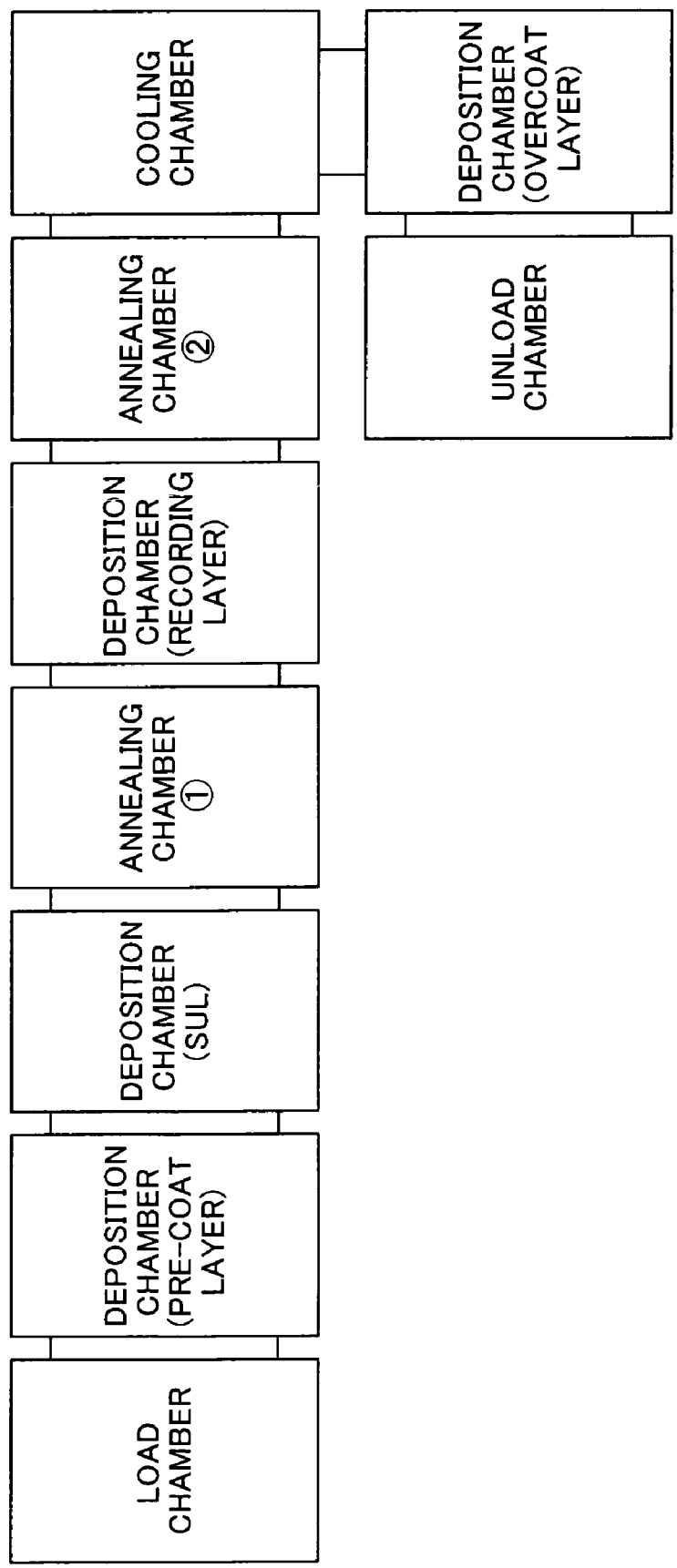
FIG. 13 is a schematic diagram of sputtering apparatus for producing the perpendicular magnetic recording medium of one embodiment of the present invention.
Figure 17:
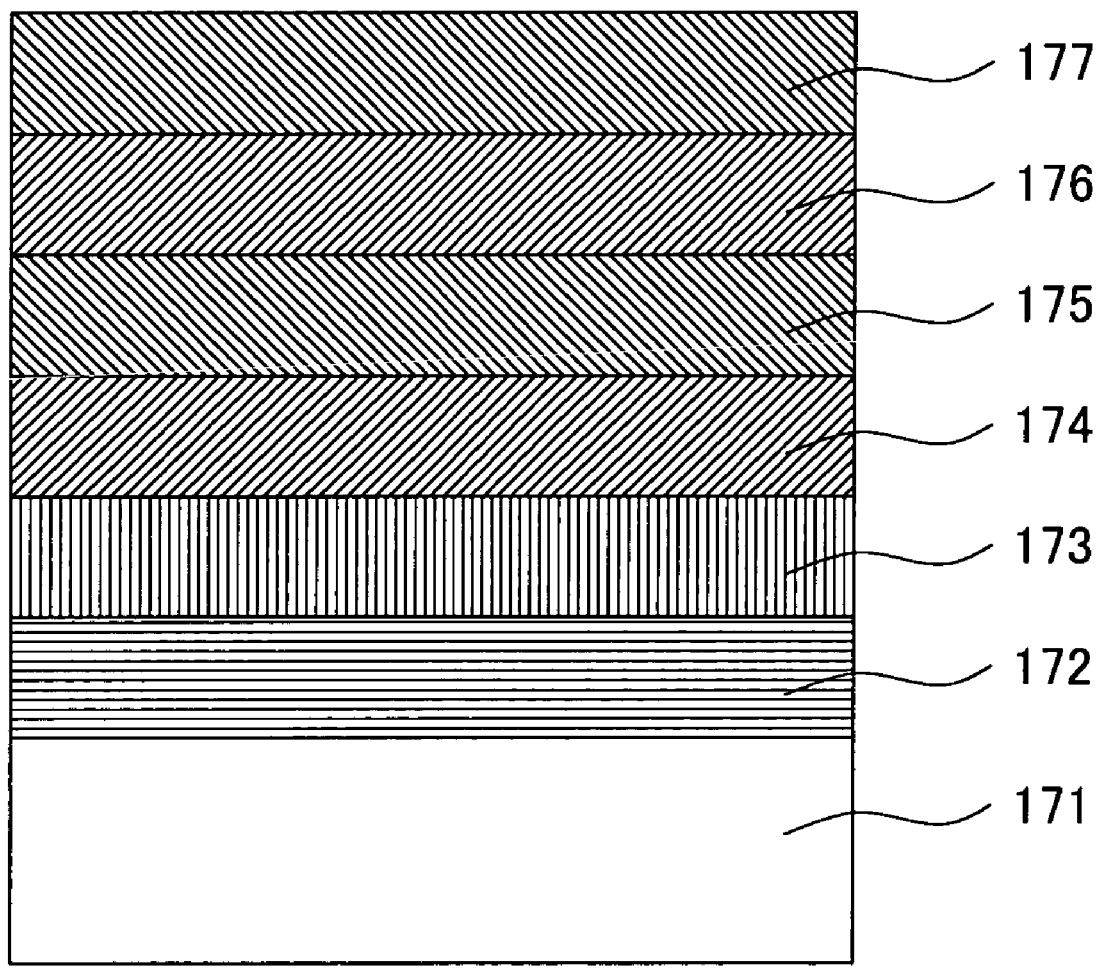
FIG. 17 is a diagram showing a layer structure of a perpendicular magnetic recording medium of prior art.

FIG. 13 shows a chamber arrangement of spputering apparatus for producing the above medium of Embodiment 1. The apparatus includes two annealing chambers, one positioned after forming the soft magnetic underlayer and the other positioned after forming the recording layer, and a cooling chamber after the second annealing (before forming the overcoat layer). A medium 170 having a domain-controlled soft magnetic underlayer (single layer structure) was produced on the same deposition conditions as for Embodiment 1 as a reference, which is shown in FIG. 17. The referential medium 170 is comprised of a substrate 171, precoat layer 172, domain control layer 173, soft magnetic underlayer 174, intermediate layer 175, recoding layer 176, and overcoat layer 177.

In this medium, the domain control layer 173 has a triple-layered structure consisting of a soft magnetic seed layer, anti-ferromagnetic layer, and ferromagnetic layer. On the substrate 171, the precoat layer 172 of NiTaZr, soft magnetic seed layer of NiFe, anti-ferromagnetic layer of MnIr, ferromagnetic layer of CoFe, and soft magnetic layer 174 of NiFe were formed in order and the substrate was heated (until the substrate temperature reached 200° C.). Next, the intermediate layer 175 of NiTaZr and recording layer 176 of CoCrPtB were formed, as is the case in Embodiment 1, the substrate was reheated and then cooled in the magnetic field, and the overcoat layer 177 of carbon was formed. Through the above process, the medium 170 was produced.

Figure 3:
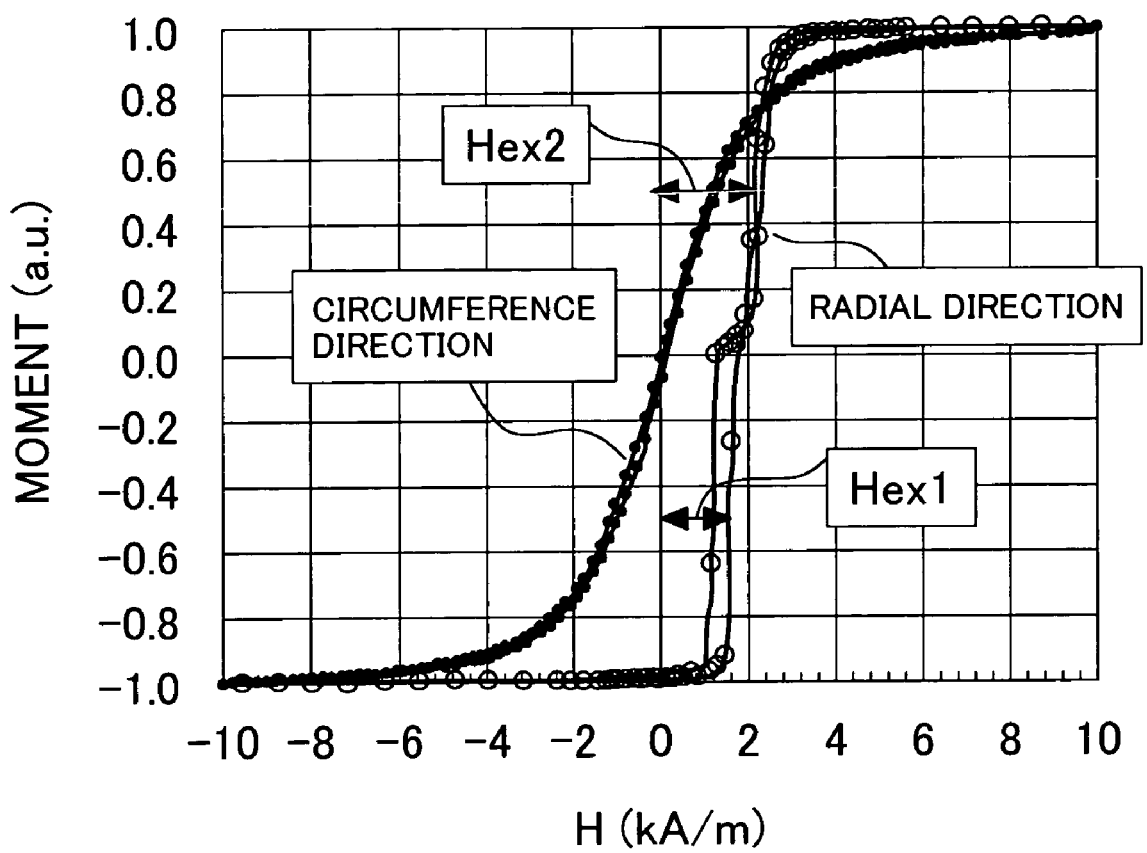
FIG. 3 shows magnetization curves of a soft magnetic underlayer of the medium of the present invention.

To evaluate the magnetic characteristics of the medium 10 of Embodiment 1, a 6-mm square piece sample cut out from the disk substrate was used and its magnetization curve was measured with a vibrating sample magnetometer (VSM). Examples of magnetization curves thus measured are shown in FIG. 3. The NiFe layers each have a thickness of 100 nm. One magnetization curve measured applying magnetic field along a circumference direction of the disk substrate,the magnetization is substantially linearly changed, and a shift of the magnetization curve is not seen along the direction of the magnetic field.

In the other magnetization curve measured applying a magnetic field along the radial direction of the disk substrate, coecivity is slight and a shift of the magnetization curve is not seen along the direction of the magnetic field. Given that the exchange bias field between the first soft magnetic layer and the anti-ferromagnetic layer of the medium of Embodiment 1 is Hex1 and the exchange bias field between the second soft magnetic layer and the anti-ferromagnetic layer is Hex2, Hex2 is greater than Hex1.

Figure 4A:
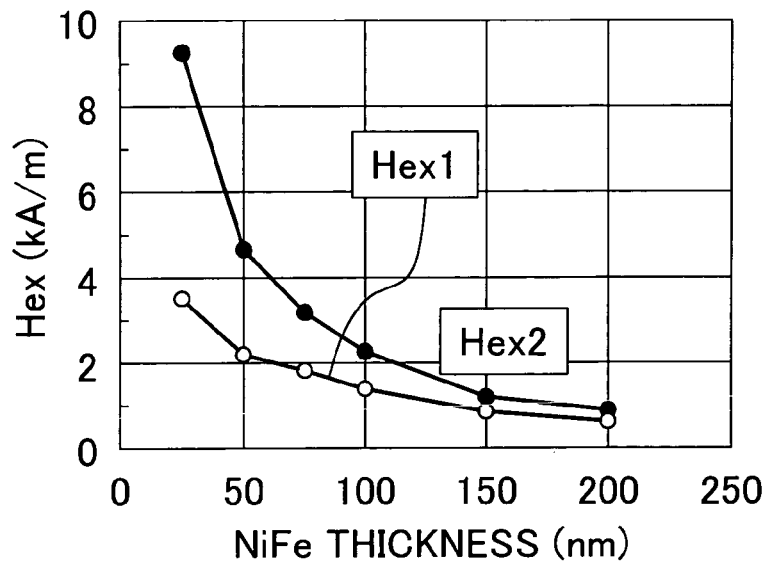
FIG. 4A shows graphs of exchange bias field vs. NiFe thickness.
Figure 4B:
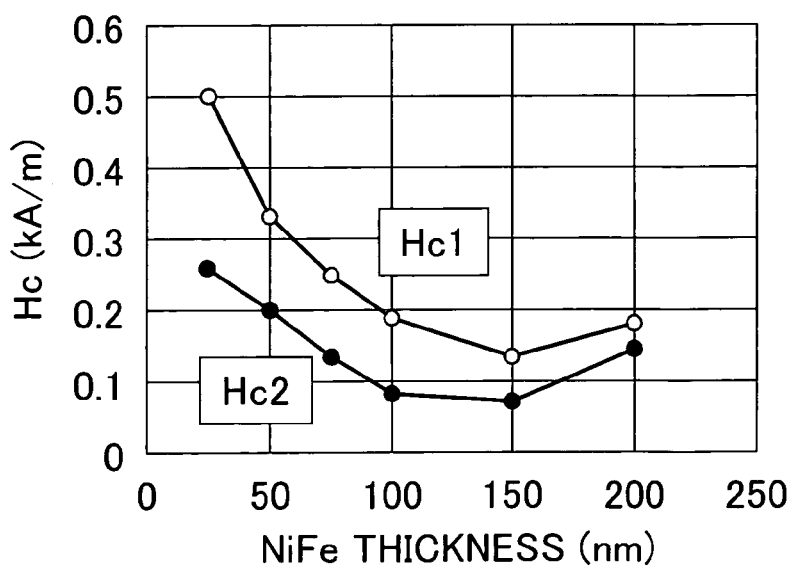
FIG. 4B shows graphs of coercivity vs. NiFe thickness.

FIG. 4 shows graphs of exchange bias field (Hex) vs. NiFe thickness and graphs of coercivity (Hc) vs. NiFe thickness when the NiFe layer thickness varies in a range. Here, the ratio of the first soft magnetic layer thickness to the second soft magnetic layer thickness d1/d2 is assumed to be 1. As the NiFe thickness becomes thinner, Hex1 and Hex2 increase. Over the range of thickness variation, the magnetization curves correspond to the two steps of the hysteresis loop and Hex2 remains greater than Hex2. On the Hc vs. NiFe thickness graphs, both Hc1 and Hc2 show minimum values at an NiFe thickness of 150 nm and these values increase as the thickness becomes thinner.

Figure 5A:
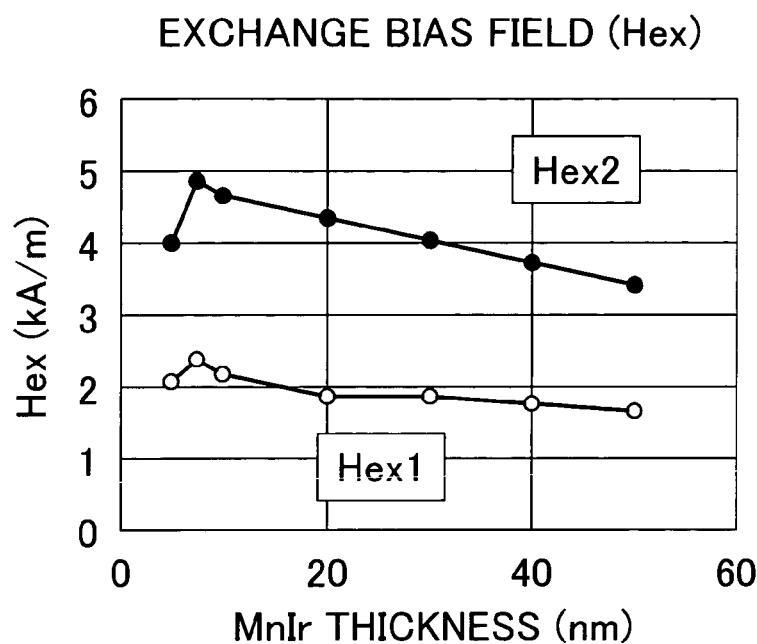
FIG. 5A shows graphs of exchange bias field vs. MnIr thickness.
Figure 5B:
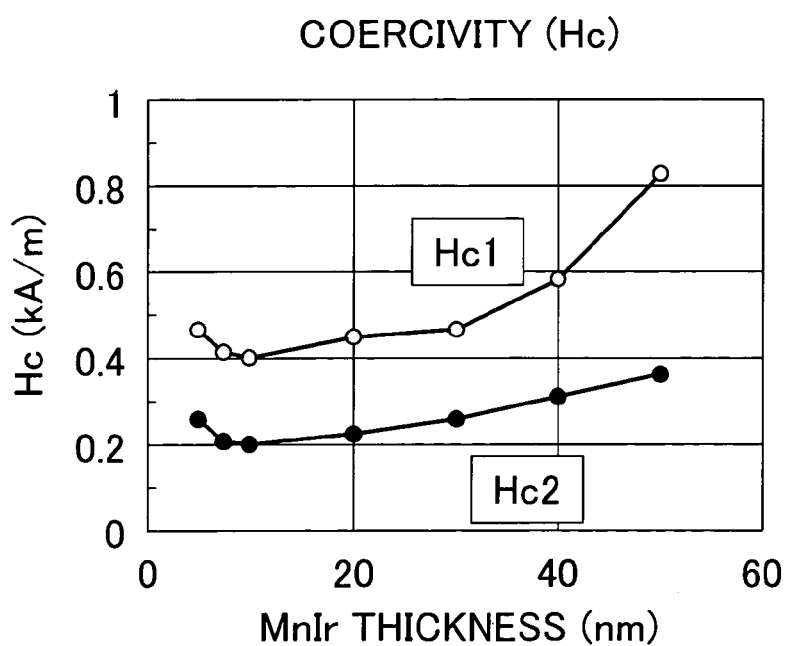
FIG. 5B shows graphs of coercivity vs. MnIr thickness.

FIG. 5 shows graphs of Hex vs. thickness of the MnIr anti-ferromagnetic layer and graphs of Hc vs. MnIr thickness. The thickness of first and second soft magnetic layers were assumed to be 50 nm. Maximum Hex values are observed when the MnIr thickness is about 10 nm and the Hex values gradually decrease as the MnIr thickness increases from 10 nm. On the Hc vs. MnIr thickness graphs, the Hc values gradually increase as the MnIr thickness increases and steeply increase when the MnIr thickness becomes 40 nm and thicker. From these measurements, the NiFe thickness should be between 25 nm and 150 nm and the MnIr thickness should be between 5 nm and 40 nm to meet high Hex and low Hc requirements.

Next, using a spinstand and a digital oscilloscope, spike noise over a disk radius of 16–28 mm was evaluated at pitches of 100 μm for samples of the medium 10 of Embodiment 1 and the referential medium 110. The following disk samples with varying thicknesses of the layers were prepared: medium A of Embodiment 1 in which the thickness of first and second soft magnetic layers (NiFe) are 100 nm, respectively and the MnIr thickness is 10 nm; medium B of Embodiment 1 in which the NiFe thickness are 200 nm and the MnIr thickness is 10 nm; medium C of Embodiment 1 in which the NiFe thickness are 100 nm and the MnIr thickness is 40 nm. Moreover, a referential medium D was prepared in which the thickness of NiFe soft magnetic seed layer is 5 nm, the thickness of NiFe soft magnetic underlayer is 200 nm, and the MnIr thickness is 10 nm.

As shown in FIG. 6, while spick noise dots were observed throughout the surface of the referential medium D, it was found that spike noise was greatly suppressed in the medium B, despite the same-thickness NiFe and MnIr layers in both media. For the medium A with the thinner NiFe layers, almost no spick noise was observed. However, for the medium C with the thicker MnIr layer, on the contrary, the number of spike noise dots was increased.

As obvious from the explanations made hereinbefore, using the layer structure of the present invention, by properly defining the thicknesses of the soft magnetic layer and the ferromagnetic layer, spike noise can be greatly suppressed. While the domain control layer applied in Embodiment 1 was made such that CoFe ferromagnetic layers were formed over and under the anti-ferromagnetic layer (type ④ of domain control layer structure in Table 1), the domain control layer may include one ferromagnetic layer over or under the anti-ferromagnetic layer (type ② or ③) or no ferromagnetic layers (type ①), which produced the same result.

Embodiment 2

Figure 7:
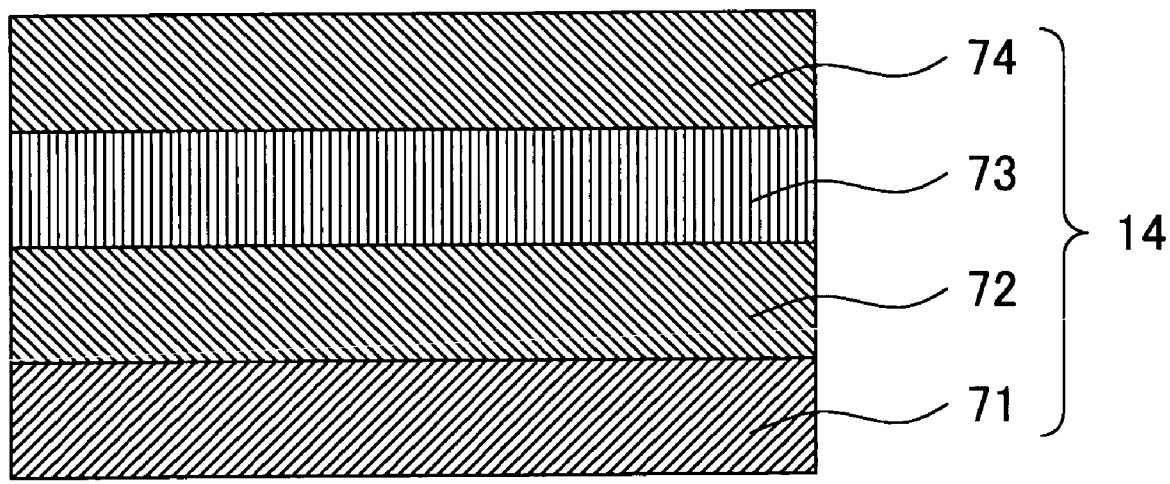
FIG. 7 is a diagram showing a layer structure of a domain control layer.

A medium 10 having the same layered structure as the perpendicular recording medium of Embodiment 1 was produced, wherein the first soft magnetic layer 13 and second soft magnetic layer 15 are made of an amorphous alloy. In a preferred Embodiment 2, the domain control layer 14 is comprised of a soft magnetic seed layer 71, first ferromagnetic layer 72, anti-ferromagnetic layer 73, and second ferromagnetic layer 74 which are deposited in order of mention, as shown in FIG. 7. Table 3 lists target compositions employed per layer, Ar gas pressure, and layer thickness. The referential medium 170 shown in FIG. 17 was produced by employing the same target compositions and on the same deposition conditions as for Embodiment 2.

TABLE 3

| | Target composition | Ar gas pressure (Pa) | Thickness (nm) |
|---|---|---|---|
| Precoat layer 12 | $Ni_{52.5}Ta_{37.5}Zr_{10}$ | 1 | 30 |
| 1st soft magnetic layer 13 | $Co_{92}Ta_3Zr_5$ | 0.5 | 20–150 |
| Soft magnetic seed layer 71 | $Ni_{81}Fe_{19}$ | 0.5 | 5 |
| 1st ferromagnetic layer 72 | $Co_{70}Fe_{30}$ | 0.5 | 2.5 |
| Anti-ferromagnetic layer 73 | $Mn_{80}Ir_{20}$ | 1 | 10 |
| 2nd ferromagnetic layer 74 | $Co_{70}Fe_{30}$ | 0.5 | 5 |
| 2nd soft magnetic layer 15 | $Co_{92}Ta_3Zr_5$ | 0.5 | 50–150 |
| Intermediate layer 16 | $Ni_{52.5}Ta_{37.5}Zr_{10}$ | 1 | 5 |
| Recording layer 17 | $CoCr_{17}Pt_{14}B_4$ | 1 | 20 |
| Overcoat layer 18 | Carbon | 1 | 5 |

Figure 8:
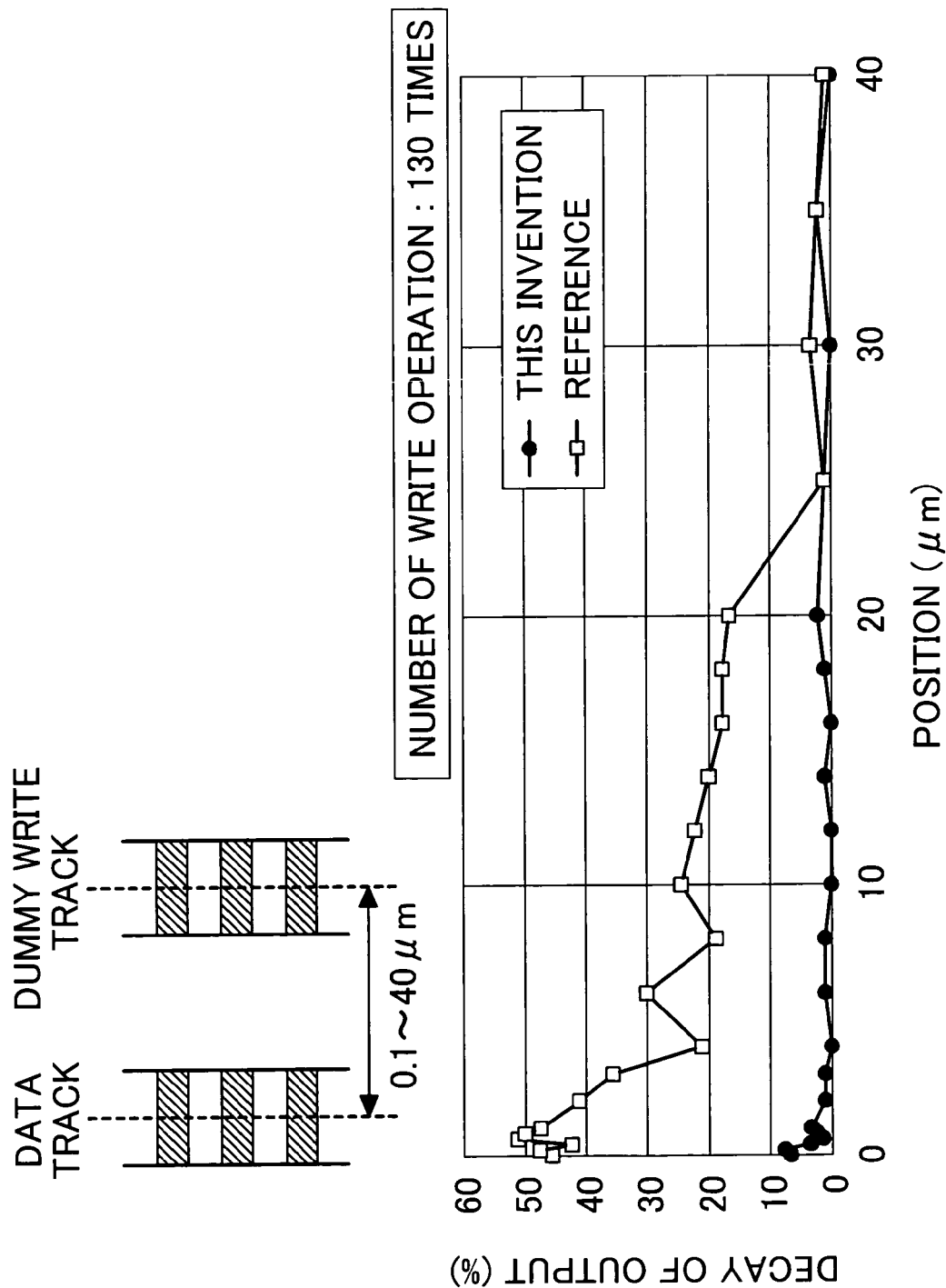
FIG. 8 shows graphs of dummy write track position vs. decay of output.

Using the medium of Embodiment 2 and a writing single-pole head with a track width of 0.25 μm and a reading GMR head with a track width of 0.23 μm and shield-to-shield spacing of 80 nm, neighboring track erasure was evaluated on condition of a flying height of 10 nm. First, 600 kFCI signals were written to tracks within a range of +40 μm from a data track and then 100 kFCI signals were written to the data track. FIG. 8 shows decay of output of a dummy write track in the neighborhood of the data track after 130 times of writing to the data track, using the medium 10 of Embodiment 2 and the referential medium 170.

Figure 9:
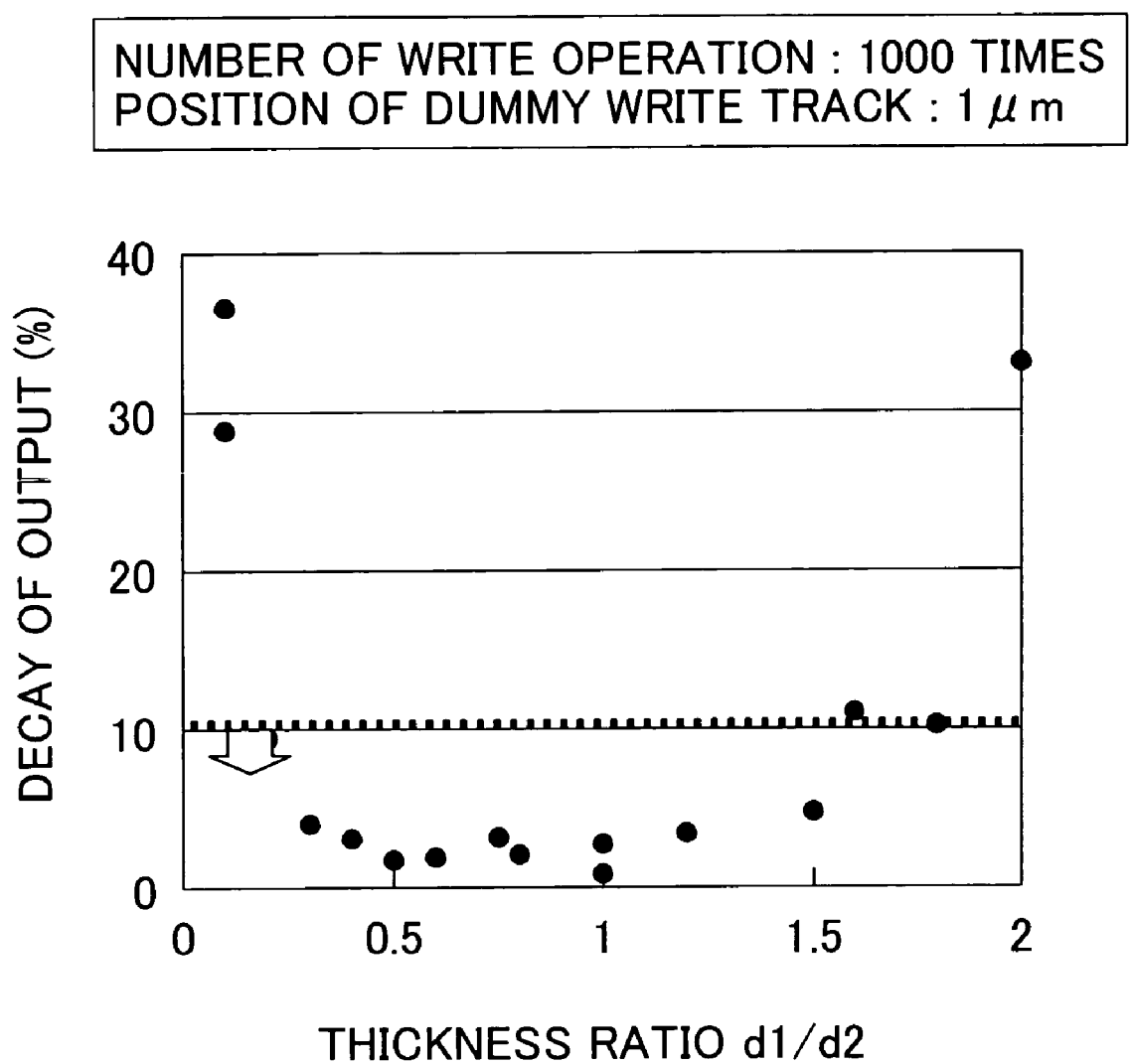
FIG. 9 shows a graph of decay of output vs. thickness ratio.

As a disk sample, medium E of Embodiment 2 was prepared in which the thickness of first and second soft magnetic layers (CoTaZr) are 100 nm, and a referential medium F was prepared in which the CoTaZr soft magnetic layer thickness is 200 nm. For the medium F of comparison, the output decreased over a wider range. For the medium E of the present invention, the output decreased slightly in a range of 1–2 μm from the data track and it is apparent that neighboring track erasure is improved. FIG. 9 shows a graph of the relation between decay of output of a dummy write track at a distance of 1 μm from the data track after 1000 times of writing to the data track and thickness ratio d1/d2, using medium samples in which the ratio of the first soft magnetic layer thickness d1 to the second soft magnetic layer thickness d2 varies.

To hold the decay to 5% and below, the ratio of the first soft magnetic layer thickness to the second soft magnetic layer thickness should be between 0.3 and 1.5, as is apparent from the graph. For medium samples in which the above thickness ratio falls within the range of 0.3 to 1.5, it is checked that spike noise was suppressed completely in any of these medium samples.

Figure 10:
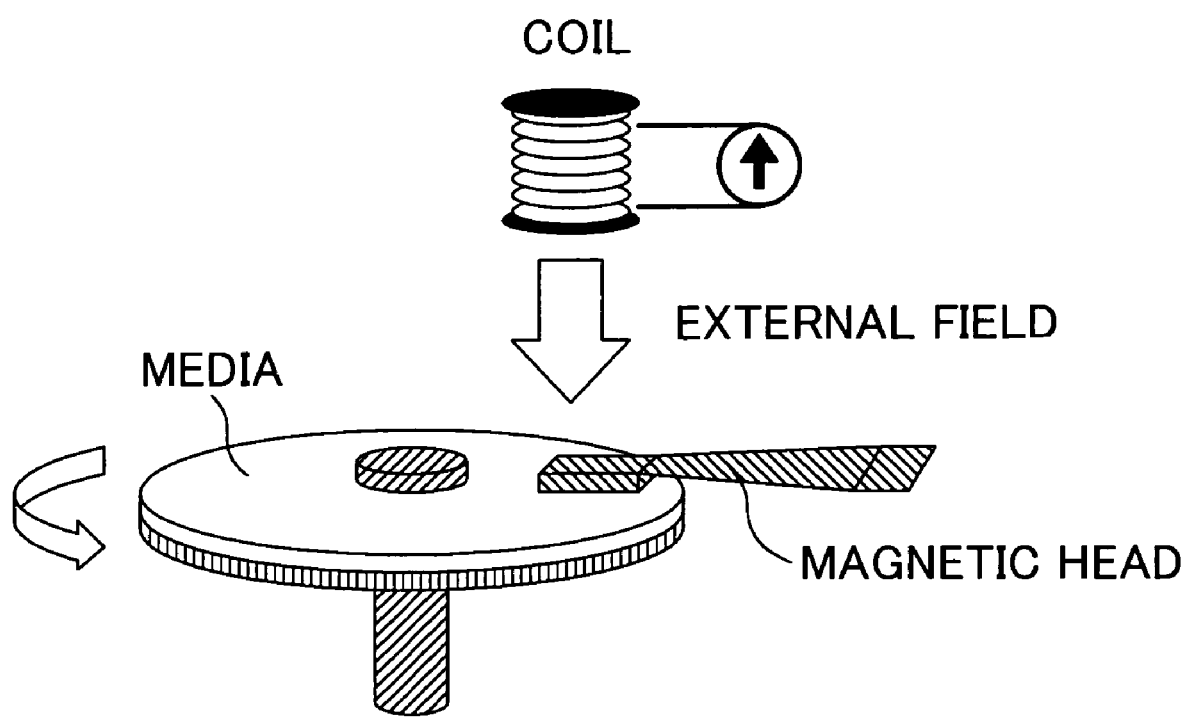
FIG. 10 is a schematic diagram for explaining a method of evaluating stray field robustness.
Figure 11:
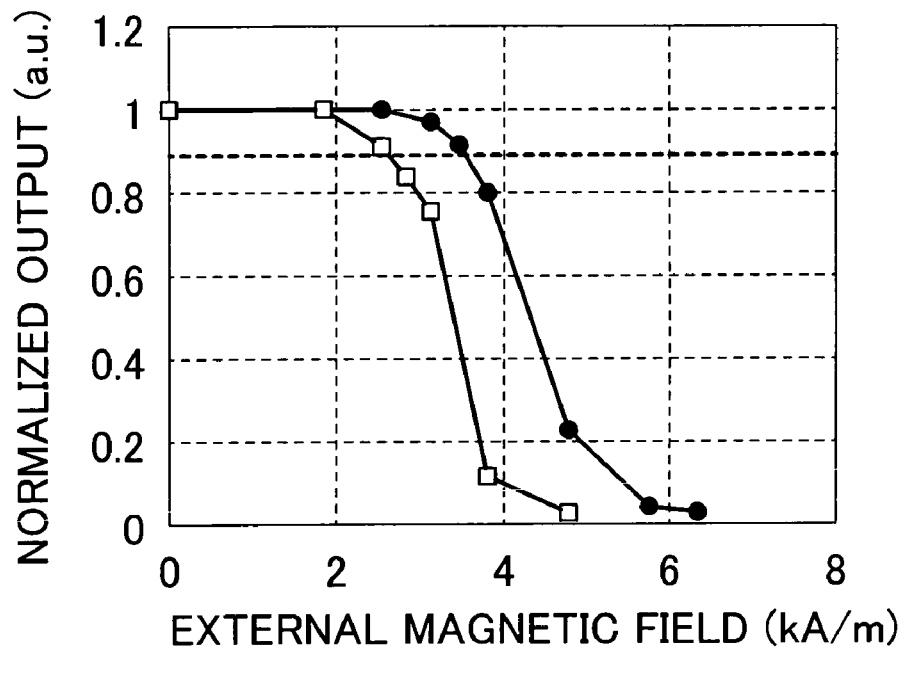
FIG. 11 shows graphs of external magnetic field vs. normalized output.

Next, the stray field robustness is estimated by using the medium E of Embodiment 2 and the referential medium F. Referring to FIG. 10, a coil is moved to approach the top surface of the medium, a magnetic field is applied perpendicularly to the medium by flowing current to the coil, and it is how the output signal changes depending on the magnetic field. FIG. 11 shows the evaluating result.

The external magnetic field that causes a 10% decrease in the output is 2.4 kA/m for the medium F of comparison and 3.5 kA/m for the medium E of Embodiment 2, and this result indicates that stray field-robustness is improved. While the domain control layer 14 applied in Embodiment 2 was made such that CoFe ferromagnetic layers were formed over and under the anti-ferromagnetic layer (type ⑧ of domain control layer structure in Table 1), the domain control layer may include one ferromagnetic layer over or under the anti-ferromagnetic layer (type ⑥ or ⑦) or no ferromagnetic layers (type ⑤), which produced the same result.

Embodiment 3

Figure 12:
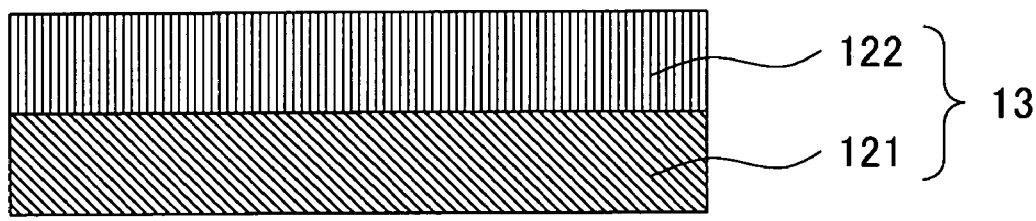
FIG. 12 is a diagram showing a layered structure of a domain control layer.

A medium having the same layered structure as the perpendicular recording medium of Embodiment 1 was produced, wherein the first soft magnetic layer 13 is made of a crystalline alloy and the second soft magnetic layer 15 is made of an amorphous alloy. In a preferred Embodiment 3, the domain control layer is comprised of a ferromagnetic layer 121 and anti-ferromagnetic layer 122 which are deposited in order of mention, as shown in FIG. 12. Table 4 lists target compositions employed per layer, Ar gas pressure, and layer thickness.

TABLE 4

|  | Target composition | Ar gas pressure (Pa) | Thickness (nm) |
|---|---|---|---|
| Precoat layer 12 | $Ni_{52.5}Ta_{37.5}Zr_{10}$ | 1 | 30 |
| 1st soft magnetic layer 13 | $Ni_{46}Fe_{54}$ | 0.5 | 100 |
| Ferromagnetic layer 121 | $Co_{70}Fe_{30}$ | 0.5 | 5 |
| Anti-ferromagnetic layer 122 | $Mn_{80}Ir_{20}$ | 1 | 10 |
| 2nd soft magnetic layer 15 | $Fe_{52}Co_{28}B_{20}$ | 0.5 | 90 |
| Intermediate layer 16 | Ru | 1 | 20 |
| Recording layer 17 | $CoCr_{13}Pt_{14}SiO_2$ | 1 | 20 |
| Overcoat layer 18 | Carbon | 1 | 5 |

On the substrate, the precoat layer 12 of NiTaZr, first soft magnetic layer 13 of NiFe, first ferromagnetic layer 121 of CoFe, anti-ferromagnetic layer 122 of MnIr, and second soft magnetic layer 15 of FeCoB were formed in order. After thus forming the soft magnetic underlayer, the substrate was heated by a lamp heater.

By this heating, the substrate temperature reached about 200° C. Then, after cooling the substrate in the magnetic field down to about 60° C. or below, the intermediate layer 16 of Ru and recording layer 17 of CoCrPt—SIO2 were formed. The magnetic field strength during the cooling is 8 kA/m in the center of the substrate. After further cooling the substrate, the overcoat layer 18 of carbon was formed and a lubricant of perfluoro alkyl polyether diluted with fluorocarbon was applied and the medium was finished by vanishing the surface. Through the above process, the perpendicular recording medium 10 of Embodiment 3 was produced.

Figure 14:
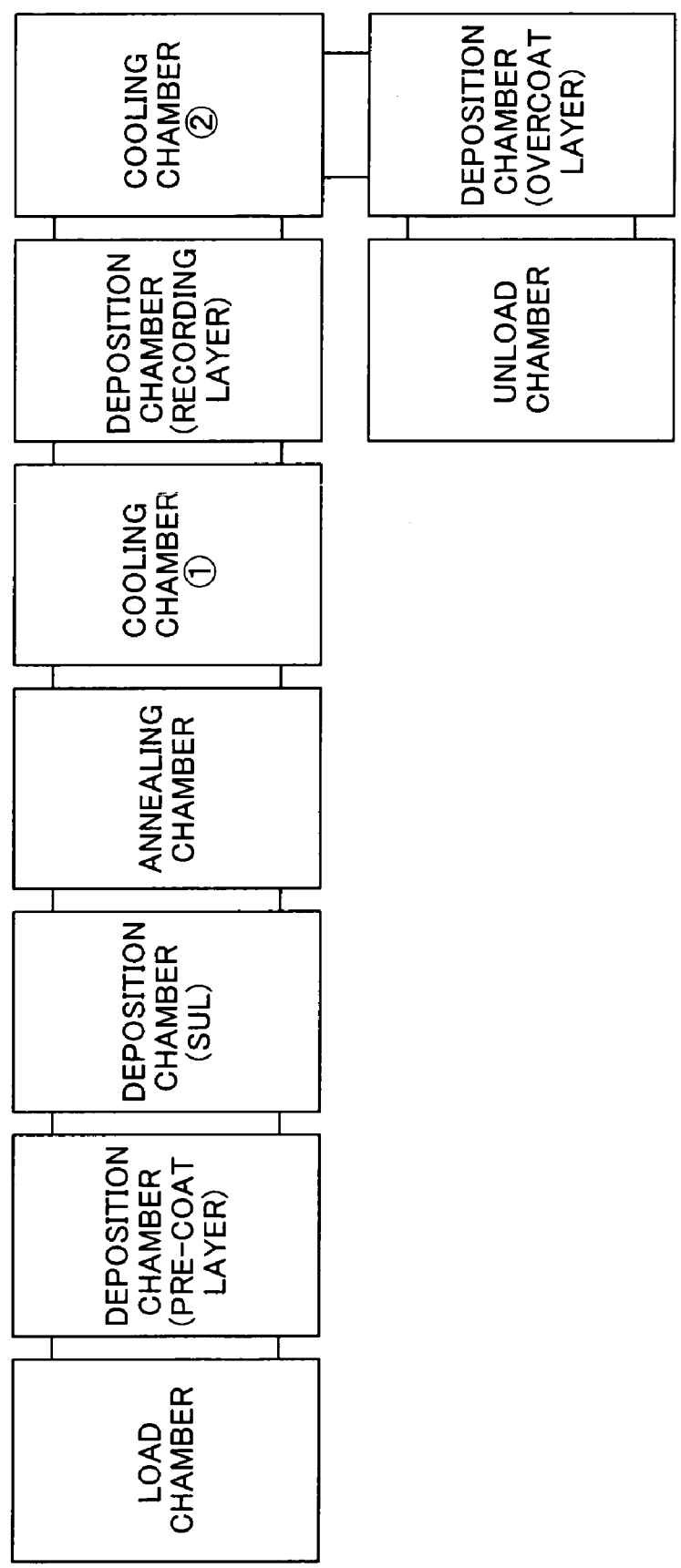
FIG. 14 is a schematic diagram of sputtering apparatus for producing a perpendicular magnetic recording medium of another embodiment of the present invention.

FIG. 14 shows a chamber arrangement of sputtering apparatus for producing the above medium of Embodiment 3. This apparatus includes an annealing chamber and a cooling chamber after forming the soft magnetic layer. In Embodiment 3, after forming the recording layer, further cooling of the substrate is performed, but this process step is not necessarily required.

The spike noise distributions were measured for samples of the medium 10 of Embodiment 3. No remarkable spike noise was observed. Furthermore, the error rate evaluation was performed under the condition that the head flying height is 8 nm by using the medium 10 of Embodiment 3 and a writing single-pole head with a track width of 0.22 μm and a reading GMR head with a track width of 0.2 μm and shield-to-shield spacing of 80 nm. The error rate of 10-6 was obtained under the condition of the areal recording density of 7.75 $Gb/cm^2$.

Embodiment 4

Figure 15A:
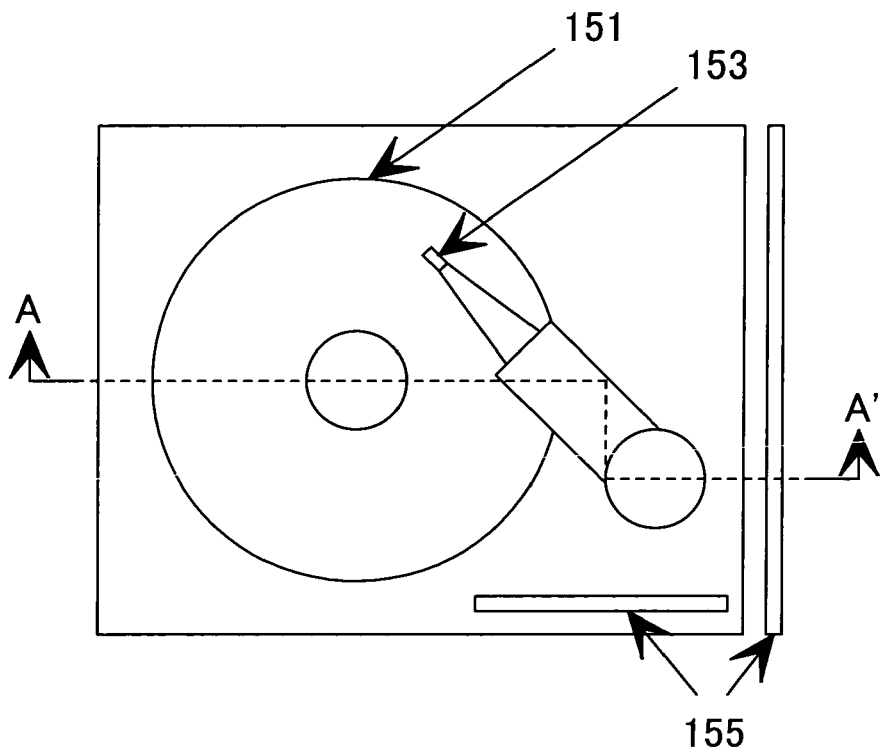
FIG. 15A is a schematic diagram (plan) of a magnetic recording/reproducing apparatus of a further embodiment of the present invention.
Figure 15B:
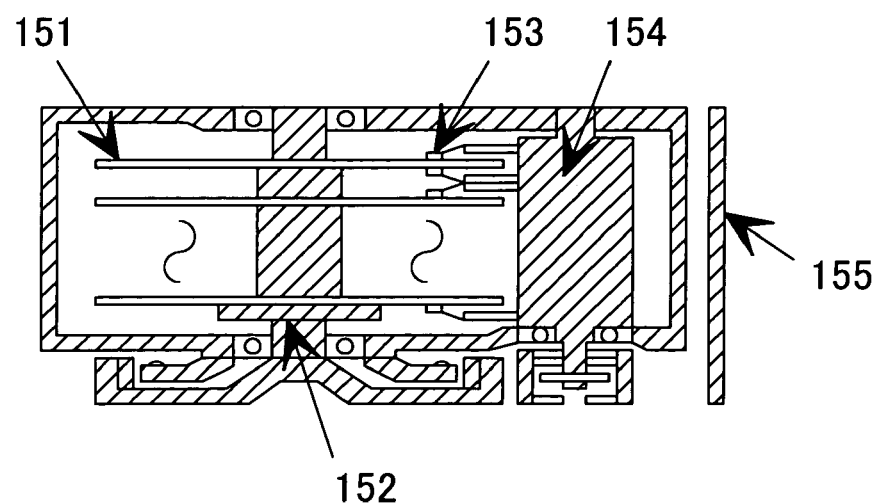
FIG. 15B is a cross-sectional view of the magnetic recording/reproducing apparatus.

A magnetic recording/reproducing apparatus according to the present invention is illustrated in FIG. 15. This apparatus is a magnetic recording/reproducing apparatus having a well-known system which comprises a perpendicular magnetic recording medium 151, an actuator 152 for rotating the recording medium, a magnetic head 153, means for moving the head 154, and a read/write channel 155 of the magnetic head. The magnetic head consists of separate write and read head elements formed on a magnetic head slider.

A single-pole type write head has a track width of 0.22 μm and a reading GMR head has shield-to-shield spacing of 80 nm and a track width of 0.2 μm. After integrating the medium 10 of Embodiment 3 into the magnetic recording/reproducing apparatus, its recording and reproducing performance was evaluated under the conditions that a head flying height is 8 nm, linear recording density is 674 kBPI, and track density is 89 kTPI. The evaluation result well satisfied specifications of recording and reproducing performance, i.e., areal recording density of 9.3 $Gb/cm^2$ in a temperature range of 10° C. to 50° C.

According to the present invention, it it is possible a magnetic recording/reproducing apparatus with a recording density over 7.75 Gbits per square centimeter, with a low error rate, and with excellent reliability.

What is claimed is:

1. A perpendicular magnetic recording medium comprising a soft magnetic underlayer and a perpendicular recording layer which are deposited in this order over a substrate,
    said soft magnetic underlayer consisting of a first soft magnetic layer, a domain control layer consisting of an anti-ferromagnetic layer, and a second soft magnetic layer in This order from said substrate,
    wherein the energy of the exchange bias field Hex2 which is applied to said second soft magnetic layer is larger than the energy of the exchange bias field Hex1 which is applied to said first soft magnetic layer, and
    wherein, in a magnetization curve of said soft magnetic underlayer, measured when a magnetic field is applied in a radial direction of the substrate, a magnetization reversal slope occurs at a shift toward a positive direction of energy of the magnetic field and coercivity Hc of the soft magnetic underlayer, which is obtained from the magnetization curve, is smaller than the energy of the exchange bias field (which corresponds to the shift quantity) Hex.

2. The perpendicular magnetic recording medium as recited in claim 1, wherein a ratio of said first soft magnetic layer thickness d1 to said second soft magnetic layer thickness d2, d1/d2, falls within a range of 0.3 to 1.5.

3. The perpendicular magnetic recording medium as recited in claim 1, wherein said anti-ferromagnetic layer thickness is between 5 nm and 40 nm.

4. The perpendicular magnetic recording medium as recited in claim 1, wherein at least one of said first soft magnetic layer and said second soft magnetic layer is made of a crystalline material.

5. The perpendicular magnetic recording medium as recited in claim 1, wherein said first soft magnetic layer is made of an amorphous material.

6. The perpendicular magnetic recording medium as recited in claim 1, wherein both the first soft magnetic layer thickness d1 and the second soft magnetic layer thickness d2 are between 25 nm and 150 nm.

7. A perpendicular magnetic recording medium comprising a soft magnetic underlayer and a perpendicular recording layer which are deposited in this order over a substrate,
    said soft magnetic underlayer consisting of a first soft magnetic layer, a domain control layer, and a second soft magnetic layer in this order from said substrate,
    wherein the energy of the exchange bias field Hex2 which is applied to said second magnetic layer is larger than the energy of the exchange bias field Hex1 which is applied to said first soft magnetic layer, and wherein, in a magnetization curve of said soft magnetic underlayer, measured when a magnetic field is applied in a radial direction of the substrate, a magnetization reversal slope occurs at a shift toward a positive direction of energy of the magnetic field and coercivity Hc of the soft magnetic underlayer, which is obtained from the magnetization curve, is smaller than the energy of the exchange bias field (which corresponds to the shift quantity) Hex, wherein said domain control layer consists of an anti-ferromagnetic layer and a ferromagnetic layer formed between and directly adjacent said anti-ferromagnetic layer and the first soft magnetic layer, or between and directly adjacent the anti-ferromagnetic layer and the second soft magnetic layer.

8. The perpendicular magnetic recording medium as recited in claim 7, wherein at least of said first soft magnetic layer and said second soft magnetic layer is made of a crystalline material or between and directly adjacent the anti-ferromagnetic layer and the second soft magnetic layer.

9. The perpendicular magnetic recording medium as recited in claim 8, further consisting of said two ferromagnetic layers, wherein a first of said two ferromagnetic layers is formed between and directly adjacent said anti-ferromagnetic layer and the first soft magnetic layer, and wherein a second of said two ferromagnetic layers is formed between and directly adjacent said anti-ferromagnetic layer and the second soft magnetic layer.

10. The perpendicular magnetic recording medium as recited in claim 7, wherein said ferromagnetic layer is a soft magnetic seed layer for controlling the orientation of magnetization of said anti-ferromagnetic layer and said soft magnetic seed layer being formed between and directly adjacent said first soft magnetic layer made of the amorphous material and said anti-ferromagnetic layer and wherein said first soft magnetic layer is made of an amorphous material.

11. The perpendicular magnetic recording medium as recited in claim 7, further consisting of wherein said first soft magnetic layer is made of an amorphous material ferromagnetic layer formed between and directly adjacent said anti-ferromagnetic layer and the first soft magnetic layer wherein said first soft magnetic layer is made of an amorphous material, or between and directly adjacent the anti-ferromagnetic layer and the second soft magnetic layer.

12. The perpendicular magnetic recording medium as recited in claim 11, further consisting of two ferromagnetic layers, wherein a first of said two ferromagnetic layers is formed between and directly adjacent said anti-ferromagnetic layer and the first soft magnetic layer, and wherein a second of said two ferromagnetic layers is formed between and directly adjacent said anti-ferromagnetic layer and the second soft magnetic layer.

13. The perpendicular magnetic recording medium as recited in claim 7, wherein a ratio of said first soft magnetic layer thickness d1 to said second soft magnetic layer thickness d2, d1/d2, falls within a range of 0.3 to 1.5.

14. The perpendicular magnetic recording medium as recited in claim 7, wherein both the first soft magnetic layer thickness d1 and the second soft magnetic layer thickness d2 are between 25 nm and 150 nm.

15. A magnetic recording/reproducing apparatus comprising the perpendicular magnetic recording medium recited in any of claims 1 to 14, an actuator for rotating the perpendicular magnetic recording medium in a recording direction, a magnetic head equipped with a mad element and a write element means for relatively moving the magnetic head with respect to said magnetic recording medium, and a read/write channel for inputting signals to said magnetic head and for recording output signals from the magnetic head, wherein the read element of said magnetic head is composed of a high sensitivity element utilizing a magnetoresistive effect or a tunneling magnetoresistive effect.

16. A perpendicular magnetic recording medium comprising a soft magnetic underlayer and a perpendicular recording layer which are deposited in This order over a substrate, said soft magnetic underlayer consisting of a first soft magnetic layer, a domain control layer, and a second soft magnetic layer in this order from said substrate, wherein the energy of the exchange bias field Hex2 which is applied to said second magnetic layer is larger than the enemy of the exchange bias field Hex1 which is applied to said first soft magnetic layer, and wherein, in a magnetization curve of said soft magnetic underlayer, measured when a magnetic field is applied in a radial direction of the substrate, a magnetization reversal slops occurs at a shift toward a positive direction of energy of the magnetic field and coercivity Ho of the soft magnetic underlayer, which is obtained from the magnetization curve, is smaller than the energy of the exchange bias field (which corresponds to the shift quantity) Hex, wherein said domain control layer consists of a first ferromagnetic layer formed directly adjacent the first soft magnetic layer, an anti-ferromagnetic layer formed directly adjacent the first ferromagnetic layer, and a second ferromagnetic layer formed between and directly adjacent said anti-ferromagnetic layer and the second soft magnetic layer.

* * * * *